United States Patent Office 3,349,053
Patented Oct. 24, 1967

3,349,053
CROSSLINKED WATER SOLUBLE POLYMER OF DIGLYCIDYL ETHER AND AN ALKANOL-AMINE
Theodore L. Ashby, Lake Jackson, Tex., assignor to The Dow Chemical Company, Midland, Mich., a corporation of Delaware
No Drawing. Filed July 31, 1964, Ser. No. 386,733
7 Claims. (Cl. 260—29.2)

ABSTRACT OF THE DISCLOSURE

This application is concerned with water soluble thermoset resins produced by the reaction of diglycidyl ether with an alkanolamine and an alkylenediamine, said alkanolamine and alkylenediamine independently containing a divalent hydrocarbon group having from 2–4 carbon atoms, the ratio of said alkanolamine to said alkylenediamine being from about 10:1 to about 100:1 and wherein the amine chemical equivalents are approximately equal to the equivalents of diglycidyl ether, said reaction product resulting from the reacting of the ingredients at a temperature between about 25 and 80° C.

---

Diglycidyl ether, i.e., bis(2,3-epoxypropyl)-ether, can be reacted with a low molecular weight alkanolamine to produce a thermoplastic resin as described in copending application Ser. No. 386,732, Ashby et al., filed July 31, 1964. According to the present invention a crosslinked thermoset polymer of diglycidyl ether and an alkanolamine can be produced by reacting either the monomers or the thermoplastic polymer with an alkylenediamine.

The alkanolamines which can be reacted with diglycidyl ether to obtain the water soluble thermoplastic product are those having the general formula:

where R is a divalent hydrocarbon group containing from 2 to 4 carbon atoms. Suitable compounds corresponding to this formula are monoethanolamine, monopropanolamine and monobutanolamine.

Alkylenediamines which can be used as cross-linking agents for these thermoplastic polymers are the low molecular weight aliphatic diamines having the following general formula:

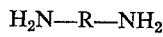

where R is a divalent hydrocarbon group containing from 2 to 4 carbon atoms. Diamines corresponding to this formula are ethylenediamine, propylenediamine and butylenediamine.

The crosslinked water soluble polymers produced according to this invention are useful as flocculating agents for aqueous systems such as the clay-containing effluent from mineral separation processes. The addition of about 0.01 to about 0.1 percent of the polymer to the wash water after it leaves the mineral recovery operation greatly accelerates the flocculation and sedimentation of suspended solids.

In the preparation of these crosslinked polymers, diglycidyl ether is reacted with the alkanolamine and diamine, with the total amine equivalents being approximately equal to the equivalents of the diglycidyl ether. The ratio of alkanolamine to alkylenediamine, based on amine equivalents, is preferably between about 10:1 and about 100:1.

To avoid the homopolymerization of the diglycidyl ether, it must be added to the alkanolamine slowly so that it reacts with the alkanolamine as it is added and a significant concentration of the diglycidyl ether is never present in the reactor. The slow addition of the diglycidyl ether to the reactor promotes the formation of the desired copolymer.

The alkylenediamine can be added to the alkanolamine prior to the start of the addition of the diglycidyl ether to the reactor or it can be reacted with a prepolymer of diglycidyl ether and an alkanolamine. The reaction in either procedure is carried out in the presence of water and at a temperature between 25° and 80° C., and preferably between about 35° and about 50° C.

These methods of producing the cross-linked polymers can be illustrated by the following examples:

Example 1

A reaction vessel having means for stirring and temperature control was charged with 116 parts by weight of monoethanolamine, 3 parts of ethylenediamine and 94.6 parts of water. The temperature of the mixture was controlled at 30° C. while 360.3 parts of diglycidyl ether were added over a 92-minute interval and reacted with the amine mixture. At the end of this initial reaction period, 520 parts of water were added and the mixture digested for 45 minutes at 35° C. then 523.1 additional parts of water were added and the digestion at 35° C. continued for 15.5 hours. The product was a yellow gel. A one percent solution of the gel in water had a viscosity of 1.23 centistokes at 100° F.

The ability of this polymer to flocculate a 5 percent suspension of illite clay in water was determined by adding 1 cc. of a 0.05 percent solution of the polymer in three increments to 100 cc. of the clay suspension as it was agitated gently. The solids settled at a rate of 7.2 inches per minute.

Example 2

The reactor was charged with 119.8 parts by weight of monoethanolamine, 1.2 parts of ethylenediamine and 126.7 parts of water. The reaction temperature was maintained at 35° C. while 260.3 parts of diglycidyl ether were added over an interval of one hour and 41 minutes. At the end of this time 251.8 parts of water were added to the reactor and the mixture digested for four hours and 22 minutes at 40° C. then 865.4 parts of water were added and the mixture digested for an additional period of 17 hours and 45 minutes at 40° C. A solution containing one percent of the solid product had a viscosity of 0.896 centistoke at 100° F. A 0.05 percent solution of the polymer flocculated a 5 percent illite suspension at a rate of 4.5 inches per minute.

Example 3

The reactor was charged with 122.2 parts by weight of monoethanolamine and the temperature maintained at 65° C. while 263 parts of diglycidyl ether were slowly added. After about one hour 96.5 parts of water were added to reduce the viscosity of the mixture then the remaining diglycidyl ether was added over a period of about 45 minutes. The mixture was digested at 40° C. for 1.5 hours then 160.8 parts of water containing 0.8 part of ethylene diamine were added to the prepolymer and the mixture digested at 40° C. for 2.75 hours. At the end of that time an additional 128.6 parts of water were added and the mixture digested for 8.25 hours at 50° C. A one percent solution, based on solid polymer content, of the viscous yellow product had a viscosity of 0.933 centistoke at 100° F.

Examples 1 and 2 illustrate the polymer preparation wherein the alkylenediamine which crosslinks the polymer is added to the initial reactor charge. Examples 3 involved the preparation of a prepolymer of the alkanolamine and diglycidyl ether which was crosslinked with the alkylenediamine.

The digestion steps following the initial reaction between the amine and diglycidyl ether promote polymer chain growth by reaction at the unconverted epoxy groups as well as crosslinking by the diamine. The length of the digestion period varies with the temperature. In Example 3 a digestion period of about 12 hours followed the initial reaction at 65° C. whereas Examples 1 and 2 had digestion times of about 16 hours and 22 hours, respectively, following reaction at 30° and 35° C. Digestion should be continued until there are no residual epoxy or primary amino groups in the product.

I claim:
1. A water soluble crosslinked resin comprising the reaction product of diglycidyl ether, an alkanolamine and an alkylenediamine, wherein the amine chemical equivalents are approximately equal to the equivalents of diglycidyl ether, each of said alkanolamine and alkylenediamine independently containing a divalent hydrocarbon group having from 2 to 4 carbon atoms and the ratio of said alkanolamine to said alkylenediamine being from about 10:1 to about 100:1 said reaction product prepared by reacting diglycidyl ether with an alkanolamine and an alkylenediamine at a temperature between about 25 and 80° C., then digesting the product of said reaction to promote polymer chain growth and cross-linking.

2. A water soluble crosslinked resin according to claim 1 wherein said alkanolamine is monoethanolamine and said alkylenediamine is ethylenediamine.

3. The method of producing a water soluble crosslinked resin comprising:
reacting diglycidyl ether with an alkanolamine and an alkylenediamine at a temperature between about 25° and 80° C.;
then digesting the product of said reaction to promote polymer chain growth and cross-linking.

4. The method according to claim 3 wherein a prepolymer is produced from said alkanolamine and diglycidyl ether then crosslinked with said alkylenediamine.

5. The method of claim 3 wherein said reaction is conducted at a temperature between 35° and 50° C.

6. The method of claim 3 wherein said reaction is conducted in the presence of water as a solvent.

7. The method of claim 3 wherein said diglycidyl ether is added to said alkanolamine at a rate approximately equal to the rate of its reaction with said alkanolamine whereby there is never a significant concentration of monomeric diglycidyl ether in the presence of said alkanolamine.

No references cited.

WILLIAM H. SHORT, *Primary Examiner.*

T. PERTILLA, *Assistant Examiner.*